Oct. 18, 1966         H. R. DINGES         3,279,658

SEED SORTING AND SELECTION APPARATUS

Filed April 6, 1964

INVENTOR.
HAROLD R. DINGES.
BY
Willard S. Grout
ATTORNEY.

United States Patent Office 3,279,658
Patented Oct. 18, 1966

3,279,658
SEED SORTING AND SELECTION APPARATUS
Harold R. Dinges, Kansas City, Mo., assignor to Precision Agricultural Machinery Company, Phoenix, Ariz., a corporation of Arizona
Filed Apr. 6, 1964, Ser. No. 357,614
2 Claims. (Cl. 222—194)

This invention pertains to an object sorting and selection apparatus and is particularly directed to a seed sorting and selecting machine.

One of the objects of this invention is to provide a highly efficient seed feeder of simple construction and operation and high reliability.

Another object of this invention is to provide a seed feeder for accurately and rapidly sorting and selecting seeds for planting in a plant row of a field.

Another object of this invention is to provide a seed feeder capable of sorting and selecting at high speed seeds to be planted in the field plant row.

It is a further object to provide a highly efficient seed feeder that is particularly well adapted to plant seed in the soil of the plant row.

Still another object of this invention is to provide a seed feeder capable of planting seed in a plant row in a highly accurate and accurately controlled manner.

It is also an object to accomplish the above recited objectives with a seed sorting and selecting device having a unique seed agitator operable over the crop row in a continuous automatic manner.

A further object is to provide a seed feeder for rapidly and accurately feeding seed in exact amounts without cracking, grinding up or otherwise damaging the seed finally discharged for a planting in the ground.

It is a further object to accomplish the above recited objectives with a specially constructed seed feeding unit devoid of reciprocating parts and operable over the crop row in a continuous rapid automatic manner.

Another object of this invention is to provide a seed feeding mechanism adapted to make individual selection of unencapsulated seeds in distributing the seeds to be planted.

Further features and advantages of this invention will appear from a detailed description of the drawings in which.

Figure 1:
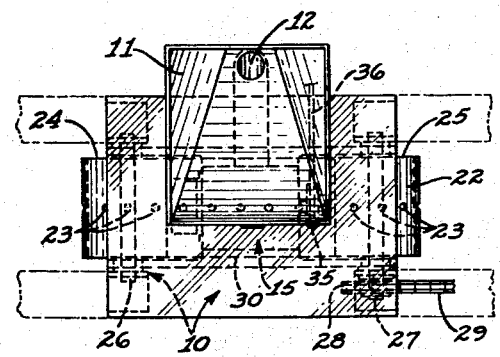
FIG. 1 is a top plan view of a seed sorting and selecting apparatus incorporating the features of this invention.
Figure 2:
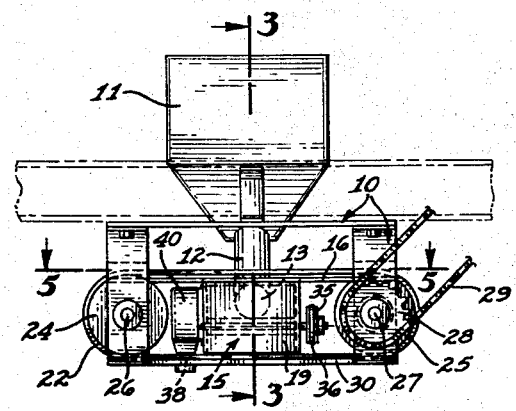
FIG. 2 is a right hand side elevation of the apparatus shown in FIG. 1.
Figure 3:
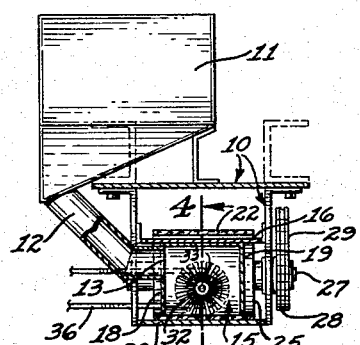
FIG. 3 is a fragmentary sectional view on the line 3—3 of FIG. 2.
Figure 4:
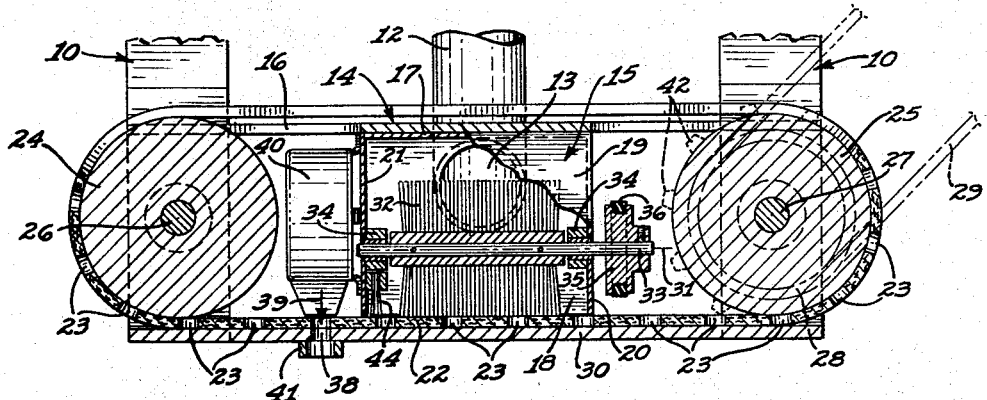
FIG. 4 is an enlarged sectional view on the line 4—4 of FIG. 3.

As an example of one embodiment of this invention there is shown a seed sorting and selecting apparatus including a frame 10 upon which is fixed a seed hopper 11, FIG. 3, carried on the seed supply pipe 12 appropriately fixed to the frame 10 connected at its lower end with the inlet passageway 13 of the seed sorting and selecting unit 14 comprising the main seed box 15 which is fixed by a suitable plate 16 to the upright supports of the frame 10 which is suitably carried on a tractor for movement over the field to be treated.

The seed box 15 comprises a top 17, sides 18 and 19 and the front end 20 and rear end 21 integrally connected together. A feed belt 22 extends under the open bottom of the seed box 15 and has a series of longitudinally spaced seed holes 23 extending through the belt and having a diameter to slightly exceed the maximum size of the sorted, untreated seed that is to be fed by the feeding apparatus. The belt 22 is of endless type and operates over a pair of spaced pulleys 24 and 25 suitably supported and journaled on shafts 26 and 27 on the frame 10.

The pulley 25 has a sprocket 28 fixed thereto over which operates the drive chain 29 adapted to be driven from a suitable source of power, not shown. The belt 22 serves as a continuously longitudinally moving bottom of the seed box 15 and is held with close tolerances to the bottom edges of the sides and ends of the seed box 15 by a plate guide 30 fixed on the frame 10 upon which the seed feeding belt 22 is slidingly supported. Preferably, one of the pulleys 24 or 25 may be arranged under tension by suitable adjustable spring loading means, not shown, to keep the seed feeding belt 22 taut so that it will not allow seeds to escape along the sides 18 and 19 of the seed box 15.

Rotating on an axis 31 that is parallel to the direction of movement of the seed feeding belt 22 is the feeding brush 32 journaled against axial movement on a shaft 33 mounted on suitable bearings 34 carried in the ends 20 and 21 of the seed box 15. The shaft 33 extends out through the end 20 and has fixed thereon a pulley 35 over which operates the belt 36 driven from a suitable source of power, not shown. The feeding brush 32 is driven with the bristles brushing lightly across the inside surface 37 of the belt 22 over the holes 23 in a transverse direction of movement of the seed feeding belt 22 as the belt feeds longitudinally under the brush 32 across the open bottom of the seed box 15. Just before the seed feeding belt 22 emerges from under the seed box 15 a fixed transverse brush 44 brushes off any seeds that might be lying on top of the belt 22.

In operation: The seed box 15 is filled with seed from the supply hopper 11 so that as the feed brush 32 is revolved it will keep the seed in constant agitation. By constantly brushing seeds across the open holes 23 in the forwardly moving belt 22 the holes 23 will eventually become filled. Once a hole 23 is filled the size of the holes will be such that another seed cannot crowd itself in, and the brush 32 will not brush hard enough to remove the seed from the hole once it has become lodged therein. The seed will be carried through or under the bottom edge of the end wall 21 of the seed box 15 to the outside, where it will encounter a discharge opening or seed ejector hole 38 in the guide plate 30. The cleaner brush 44 fixed to the rear end wall 21 is adapted to brush off any seeds that might be lying on top of the belt as it emerges from the seed box 15. A constant, gentle flow of air 39 blowing downwardly from an air supply source 40 against the top of the belt will force the seed through the hole 38 in the plate 30 into a retention chamber 41 in which the seed is to be dropped and planted.

Figure 5:
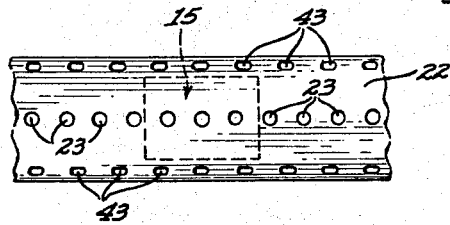
FIG. 5 is a fragmentary view on the line 5—5 of FIG. 2 showing a modified belt structure.

In certain instances it may be desirable to provide positive driving lugs 42 on the pulley 25 to maintain a non-slip positive synchronization of the seed feeding belt with other apparatus with which it may be used. In the arrangement of FIG. 5, the belt 22 of the feeder is made wider than the box 15 and will have large perforations 43 along its outer edges which mesh with the lugs 42 on the driving pulley 25. It is understood that this apparatus is not limited to use as a seed feeding device but is well adapted to handle other items or work such as feed parts to automatic machine tools and the like.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein. Having thus fully set forth and described this invention what is claimed and desired to be obtained by United States Letters patent is:

1. A seed sorting and selecting apparatus comprising in combination:
   (a) a frame,
   (b) a totally enclosed seed box fixed on said frame having,
   (c) an inlet passageway in the top portion of said seed box,
   (d) an open bottom,
   (e) and a seed chamber formed within said seed box communicating with said open bottom,
   (f) a seed hopper on said frame communicating with said inlet passageway,
   (g) a pair of pulleys journaled on said frame having an endless feed belt operatively supported on said pulleys,
   (h) a guide plate fixed on said frame below the open bottom of said seed box adapted to engage and slidingly support the under outer surface of the lower run of said endless feed belt to maintain the bottom of said seed box closed as said belt moves under said open seed box bottom,
   (i) a discharge opening in said guide plate located beyond the rear end of said seed box,
   (j) means for ejecting a seed from said seed discharge opening in said guide plate,
   (k) a series of longitudinally spaced seed receiving holes individually formed through said endless feed belt arranged to successively move over said discharge opening in said guide plate.
   (l) means for driving said endless feed belt pulleys and belt,
   (m) and means in said seed box for agitating the seeds therein to cause a seed to enter each seed hole in said endless feed belt.

2. In a seed sorting and selection apparatus as set forth in claim 1 wherein said seed box agitating means comprises a cylindrical brush rotating on a horizontal axis extending parallel to the direction of belt travel including radially extending bristles adapted to brush a seed into each of said endless feed belt seed holes, and means for revolving said brush about said axis to cause the outer ends of said brush bristles to sweep laterally in a relative diagonal path across said inner surface of said belt during the rotation of said pulleys.

References Cited by the Examiner

UNITED STATES PATENTS 21,273   8/1858   Fox _____ 222—371 X

FOREIGN PATENTS 199,826   6/1908   Germany.

ROBERT B. REEVES, *Primary Examiner.*